United States Patent
Bergholz et al.

[11] Patent Number: 6,151,539
[45] Date of Patent: Nov. 21, 2000

[54] AUTONOMOUS VEHICLE ARRANGEMENT AND METHOD FOR CONTROLLING AN AUTONOMOUS VEHICLE

[75] Inventors: Ralf Bergholz, Braunschweig; Klaus Timm, Wentorf; Hubert Weisser, Lehre, all of Germany

[73] Assignee: Volkswagen AG, Wolfsburg, Germany

[21] Appl. No.: 09/185,291

[22] Filed: Nov. 3, 1998

[30] Foreign Application Priority Data

Nov. 3, 1997 [DE] Germany ............... 197 48 405

[51] Int. Cl.⁷ .................. G01C 22/00; G05D 1/00
[52] U.S. Cl. ................ 701/25; 701/300; 701/301; 701/200; 701/201; 701/96; 340/435; 340/904
[58] Field of Search .............. 701/25, 200, 96, 701/117, 301, 201, 300; 340/907, 901, 902, 903, 904, 905, 425.5, 435

[56] References Cited

U.S. PATENT DOCUMENTS

| | | | |
|---|---|---|---|
| 5,229,941 | 7/1993 | Hattori | 364/424 |
| 5,396,426 | 3/1995 | Hibino et al. | 701/96 |
| 5,467,284 | 11/1995 | Yoshioka et al. | 701/301 |
| 5,594,413 | 1/1997 | Cho et al. | 340/903 |
| 5,610,815 | 3/1997 | Gudat et al. | 364/424 |
| 5,684,696 | 11/1997 | Rao et al. | 701/25 |
| 5,732,385 | 3/1998 | Nakayama et al. | 701/201 |
| 5,835,028 | 11/1998 | Bender et al. | 340/937 |
| 5,944,768 | 8/1999 | Ito et al. | 701/200 |
| 5,964,822 | 10/1999 | Alland et al. | 701/301 |
| 5,999,092 | 12/1999 | Smith et al. | 340/436 |
| 6,026,346 | 2/2000 | Ohashi et al. | 701/210 |
| 6,060,989 | 5/2000 | Gehlot | 340/576 |

FOREIGN PATENT DOCUMENTS

| | | |
|---|---|---|
| 0679975 | 11/1995 | European Pat. Off. . |
| 0679976 | 11/1995 | European Pat. Off. . |
| 9613024 | 5/1996 | WIPO . |

OTHER PUBLICATIONS

"Implementation of Active Safety Systems to Avoid Frontal Collisions" by A. Saroldi; pp. 31–36.

"Lateral Support for Collision Avoidance" by Antonello et al; pp. 19–30.

"ProLab2: An Intelligent Onboard System for Driving Assistance" by Rombaut et al; pp. 31–47.

"Towards Autonomous Cruising on Highways" by Okuno et al; pp. 7–16.

*Primary Examiner*—William A. Cuchlinski, Jr.
*Assistant Examiner*—Olga Hernandez
*Attorney, Agent, or Firm*—Baker Botts L.L.P.

[57] ABSTRACT

An autonomous vehicle and method for controlling it includes an input unit to receive one or more travel orders, a route planning unit containing at least one position finding device and digital street map, a vehicle path generating a unit, an array of sensors including at least one range sensor for detecting objects and at least one range sensor for detecting the condition features of the route, a collision avoidance unit, a vehicle condition data recognition unit, a vehicle control unit and a unit for controlling the vehicle actuator system based on the signals generated by the vehicle control unit, wherein the array of sensors includes at least two essentially horizontally directed range sensors at the front of the vehicle, at least one range sensor at the rear area of the vehicle, at least one trackable range sensor on the roof of the vehicle and directed at the roadway, ultrasonic sensors and/or microwave radar sensors arranged on each side of the vehicle, and at least one camera located in each of the front and rear areas of the vehicle.

31 Claims, 9 Drawing Sheets

AUTONOMOUS VEHICLE ARRANGEMENT AND METHOD FOR CONTROLLING AN AUTONOMOUS VEHICLE

BACKGROUND OF THE INVENTION

This invention relates to an autonomous vehicle arrangement and methods for controlling autonomous vehicles.

Many efforts to provide autonomous vehicles have been made. As used herein "autonomous vehicle" means a driverless vehicle that moves independently from a point of origin to a destination, with or without human passengers. Autonomous vehicles must be distinguished from vehicles that are remotely controlled by wire or radio so that a person outside of the vehicle continues to take responsibility for the movement.

Autonomous vehicles have already reached such a standard in the field of materials transport that they have found a variety of industrial applications. Thus, autonomous vehicle arrangements have been proposed in which a guide cable or control wire is disposed along a route and the vehicle is guided along the guide cable. When a specific signal is transmitted to the guide cable, the presence of the signal is detected by a pickup coil installed on the vehicle, and the vehicle moves along the guide cable route, and any deviation from the prescribed route is determined with the aid of the guide cable. In a further conventional arrangement for an autonomous vehicle system, an optically reflecting tape, for example an aluminum or polyvinyl tape, is placed along the surface of the travel path instead of a guide cable, and a light projector and a photodetector are mounted on the autonomous vehicle. The light emitted by the projector is reflected by the tape and received by the photodetector and, in this way, the unmanned vehicle is guided along the reflecting tape. A disadvantage of the conventional autonomous vehicle arrangements is that desired vehicle routes cannot be freely chosen, but instead must be installed in advance.

U.S. Pat. No. 5,229,241 discloses an autonomous transport vehicle containing an image processing unit that photographs the environment in the forward direction of the vehicle and processes the photographed image, a position finding unit that calculates the position of the vehicle in an absolute coordinate system on the basis of information obtained from a wheel speed sensor, a gyroscope and the like, a drive unit that includes the vehicle's steering, gas pedal, brake system, turn signals and the like as well as actuators to operate these devices including the associated servo drivers, a unit in which are stored site plan data and map data regarding a destination and information defining a route, a travel control unit that controls the drive unit with the aid of the information obtained from the image processing unit, the position finding unit, and the information storage unit in such a way that the vehicle drives to a final destination, and a user interface for entry of information relating to a destination, i.e., a variety of destination points that are defined on the route by the travel control unit, and for display of the image obtained from the image processing unit as well as other information.

For this purpose, the image processing unit includes two cameras located at the front of the vehicle which record a stereo image of the environment. The spatial image photographed by the two cameras is converted through an inverse transformation in an image processing unit into a plane image. For instance, the image processing unit identifies a pair of white guide lines painted along the travel path, a travel path side boundary, a center line and the like, and measures the length of the lines in relation to the vehicle. In particular, through the sensing of the white lines on the travel path, the spatial relationship between the vehicle and the travel path is calculated, i.e. the distance of the vehicle from the white line on the left and/or right side of the travel path, the angle between the forward direction of the vehicle and the travel path, and the like and, in the case of a curved travel path, the direction of the curve is determined at half the distance of the travel path. In addition, the distance of the vehicle from an intersection is determined by detecting and measuring the intersection point of the white lines before the intersection is reached.

The image processing unit further contains an ultrasonic sensor, a laser radar and the like for detecting obstacles located on the travel path in front of the vehicle and to the side of the vehicle, as, for example, a vehicle traveling in front, a protective barrier, and the like, and for transmitting the corresponding information to a position finding unit of the vehicle. The position finding unit includes two wheel speed sensors that are located on the left and right rear wheels of the vehicle, a processing unit that receives and processes the output signals of the two wheel speed sensors, and a calculation unit for calculating the location of the vehicle in global coordinates. The wheel speed sensors detect the rotation of the vehicle's rear wheels and generate several thousand pulses per revolution for each wheel. When a difference is found in the number of pulses generated for the individual wheels, this means that there is a difference in the distance covered by the corresponding wheels, and this difference in the distance covered forms the basis for determining the curvature of the section of travel path being traveled by the vehicle. In addition, the distance covered by both wheels indicates the distance traveled by the vehicle. The path of the vehicle can thus be calculated on the basis of the sequences of data provided by the wheel speed sensors. In particular, information relating to the location and position of the vehicle at a specific point in time, i.e. information regarding the vehicle's location and direction of travel in an X-Y coordinate system, can be derived.

If the vehicle location is known at the start of the trip, the current location of the vehicle during the trip can be monitored continuously, since the wheel speed data is processed sequentially. Because the errors in the determination of vehicle location accumulate, the measurement errors increase with increasing distance traveled by the vehicle. For this reason, a gyroscope is provided so that the position in an absolute coordinate system can be determined with high accuracy. However, such an autonomous vehicle for material transport is only suitable for use in defined areas, such as manufacturing halls or an industrial plant, where nearly identical external conditions prevail.

In addition, German Offenlegungsschrift No. 41 24 654 describes a method for continuous and automatic vehicle orientation on a travel path in which an automatic vehicle guidance system is provided for better utilization of transport capacity of traffic routes. In this method, a television camera that is mounted on the vehicle as high as possible above the travel path continuously transmits digitized image sequences at the video rate to a computer system with a program for special signal processing and interpretation in the vehicle. In this method, generic street models and simple, generic, dynamic models for the vehicle movement are utilized in order to be able to use previously incorporated travel path recognition and relative vehicle position recognition to evaluate the next image. For this purpose, three partial models are combined. Monocular image data of only the last image are analyzed with recursive estimation methods to determine street parameters and the vehicle's location with respect to the streets. In this way, a spatial projection is produced in the computer of the current street path in the area of prediction.

U.S. Pat. No. 5,610,815 discloses an autonomous vehicle, specifically for use in open-pit mining, that has a first position finding system based on GPS (Global Positioning System) and a second IRU (Inertial Reference Unit) positioning system based on a gyroscope, and the data from these systems are computed together in a third position finding system for accurate position determination. In addition, the autonomous vehicle contains a navigation system by which the vehicle can be guided on predefined or dynamically determined routes. The navigation system monitors the current position as well as the mechanical vehicle components such as brakes, steering and motor, and can shut down the vehicle if serious malfunctions occur. Moreover, the navigation system includes an obstacle detection device in order to detect objects located on the planned route and, if necessary, to steer an avoidance course or stop the vehicle. For this purpose, an infrared laser scanner in single line mode is placed on the roof of the vehicle, where the scanning angle is between 10° and 30°. The scanning beam is oriented in such a way that it does not reach the ground. This ensures that detected obstacles are not the result of irregularities in the ground. For detection of ground irregularities, a second laser scanner in multiple line mode is aimed at the ground at a specific angle. That angle is selected in such a way that obstacles are detected at a distance corresponding to the vehicle stopping distance so that the vehicle can be stopped in time before reaching the obstacle.

This autonomous vehicle designed especially for open-pit mining is very advanced in the areas of position finding and route generation, but does not take into account important aspects for the use of an autonomous vehicle in traffic on public roads. Thus, for example, a limitation of the field of view to be evaluated is not possible in street traffic, since vehicles on merging streets must be detected in advance in a timely manner, on the one hand in order to adapt the driving behavior to the applicable traffic regulations, and on the other hand also to be able to react preventively to improper behavior of a vehicle on a merging street. This illustrates that, while basic structures of the known autonomous vehicles are generally suitable in part, as, for example, the position finding system, others are inadequate in the known art.

SUMMARY OF THE INVENTION

Accordingly, it is an object of the present invention to provide an autonomous vehicle arrangement and a method for controlling an autonomous vehicle that overcomes the disadvantages of the prior art.

Another object of the invention is to provide an autonomous vehicle that is suitable for use in traffic on public roads, as well as a method for controlling one or more autonomous vehicles.

These and other objects of the invention are attained by providing an autonomous vehicle arrangement having a vehicle control unit, a system for actuating vehicle components based on signals generated by the vehicle control unit, and an array of sensors for detecting objects and conditions along a route to be followed by the vehicle including at least three range sensors mounted at the front of the vehicle, at least one range sensor mounted at the rear of the vehicle, at least one ultrasonic or microwave sensor mounted on each side of the vehicle, and at least one camera mounted at each of the front and rear areas of the vehicle. Preferably, a thermal imaging camera for detecting the presence of living creatures is mounted at the front region of the vehicle.

In accordance with the method of the invention a desired travel destination for the vehicle is entered in an input unit, the current location of the vehicle is determined, and an optimal travel route is planned by a route planner taking into account traffic information, information previously stored in a digital map, and information detected by sensors on the vehicle, and corresponding signals are supplied to a vehicle control system which controls vehicle actuators in accordance with the received signals.

In this arrangement, various sensors which are conventional in motor vehicles are synergistically used together so that the array of sensors can, in the broadest sense, reliably detect and appropriately react to all surrounding objects and/or obstacles under all weather conditions and in a wide variety of traffic situations, including operation on roads. This also makes it possible to use an autonomous vehicle in traffic on public roads or in other complex environments.

BRIEF DESCRIPTION OF THE DRAWINGS

Further objects and advantages of the invention will be apparent from a reading of the following description in conjunction with the accompany drawings, in which.

DESCRIPTION OF PREFERRED EMBODIMENTS

Figure 1:
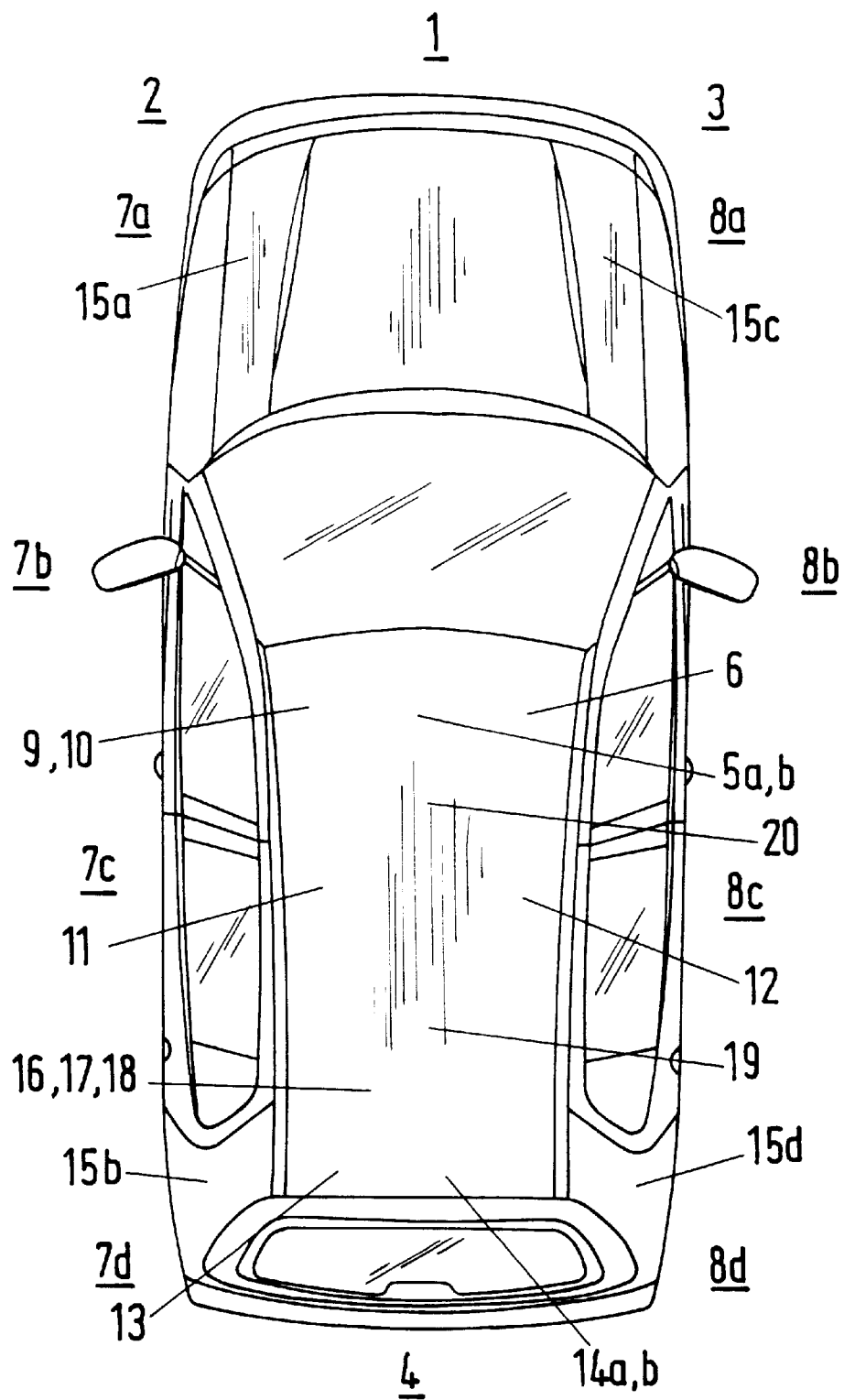
FIG. 1 is a top view showing a representative embodiment of an autonomous vehicle according to the invention having an array of sensors.
Figure 3:
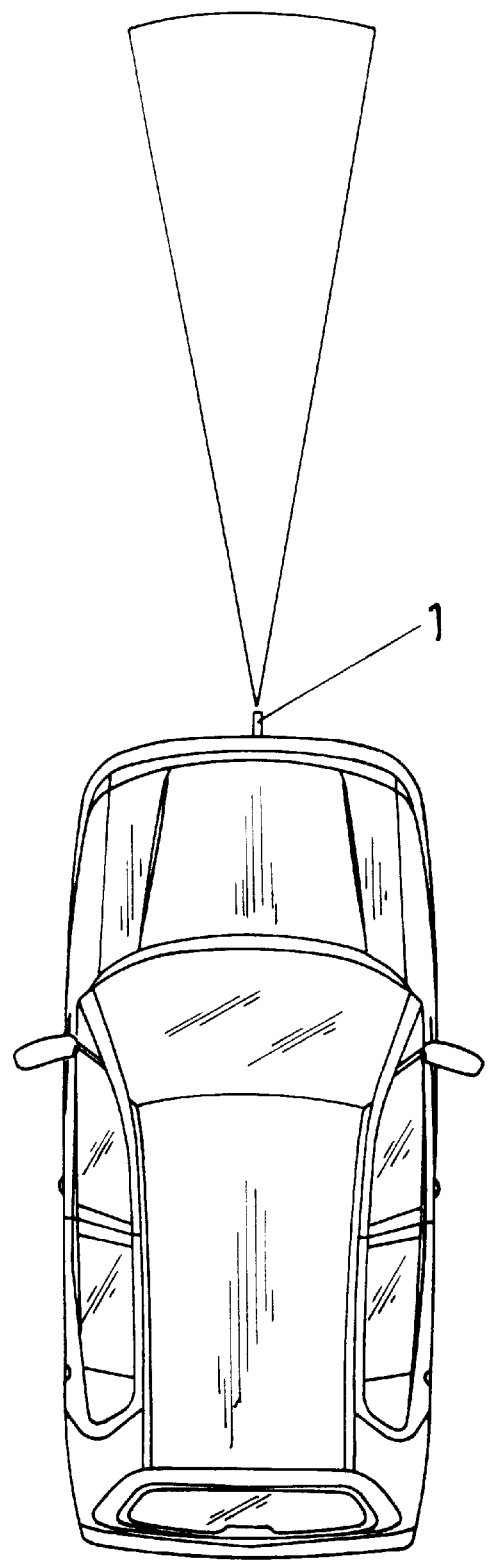
FIG. 3 is a top view showing the radiation pattern of a radar sensor.

FIG. 1 illustrates schematically a top view of a typical embodiment of an autonomous vehicle according to the invention schematically showing a variety of sensors having individual modes of operation and function which are explained below. At least one radar sensor 1 is mounted in the front area of the autonomous vehicle. Such radar sensors are known, for example, from range finding devices, for example ADR (Automatic Distance Regulation), used in vehicles. Using the radar sensor 1, the number of objects in the area in front of the autonomous vehicle, their distance from it, and their relative speed can be determined, for example. Because of the strictly limited horizontal detection range of radar sensors, they are provided solely for object detection in front of the vehicle. The radiation pattern of the radar sensor 1 is shown in FIG. 3.

Figure 4:
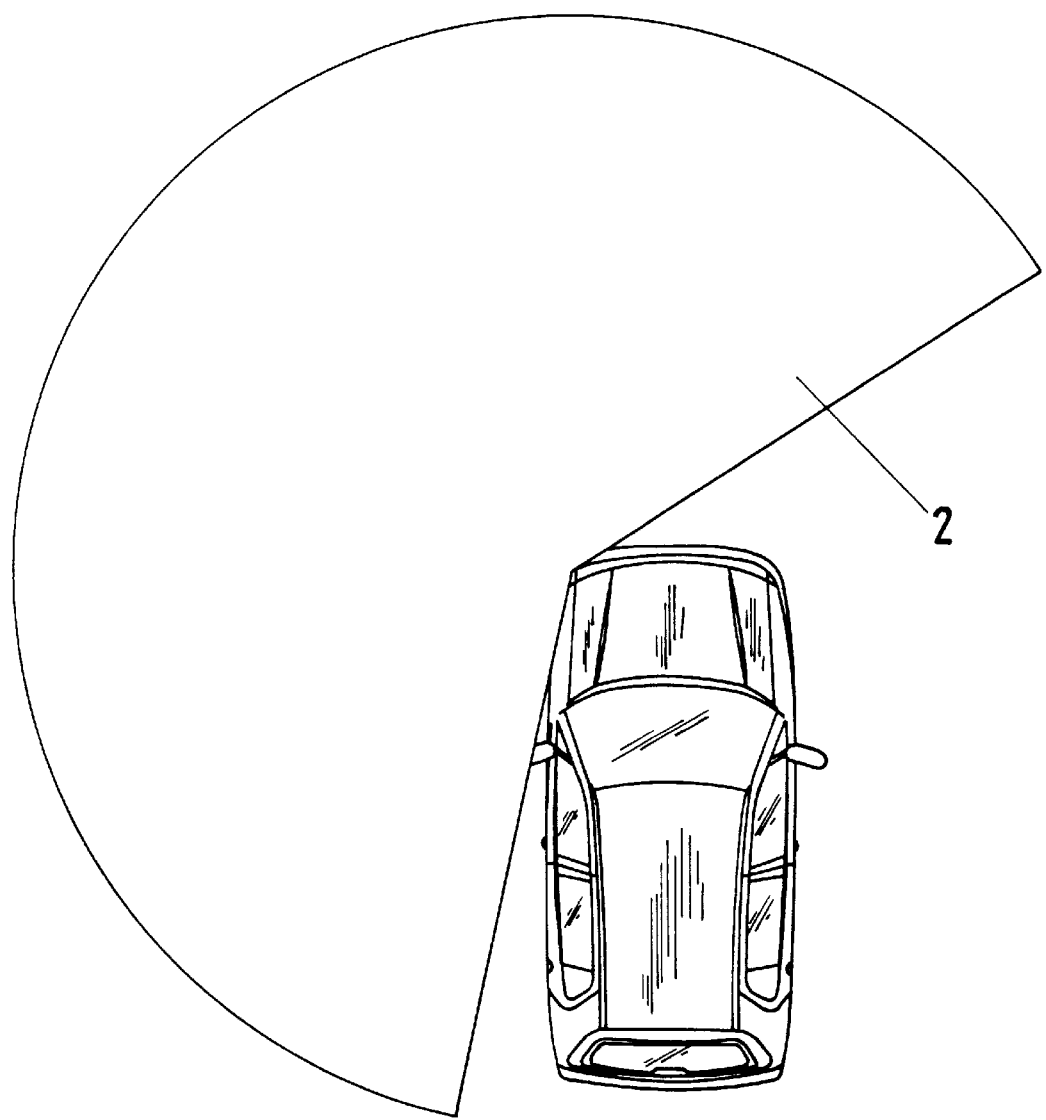
FIG. 4 is a view showing the radiation pattern of a laser scanner sensor in the front area of the vehicle.

The advantage of radar as compared to optical sensing equipment is that radar retains its performance capability even under adverse weather conditions such as fog, snow, rain and dust. This advantage requires the radar sensor 1 to be used in support of two laser scanner sensors 2 and 3, which are also used for object detection, in particular for object detection at intersections and lane merges. The laser scanner sensors 2 and 3 are located near the front corners of the vehicle, for example in the fenders. The two dimensional laser scanner sensors 2 and 3 each have a horizontal detection range angle of about 270° so that only one additional laser scanner sensor 4 with a horizontal range angle of 180° need be provided in the rear area of the vehicle. The radiation pattern of the laser scanner sensor 2 is shown in FIG. 4. The laser scanner sensor 3 has a corresponding pattern so that the two front corner laser scanners cover essentially the entire front and side areas of the vehicle.

Figure 5:
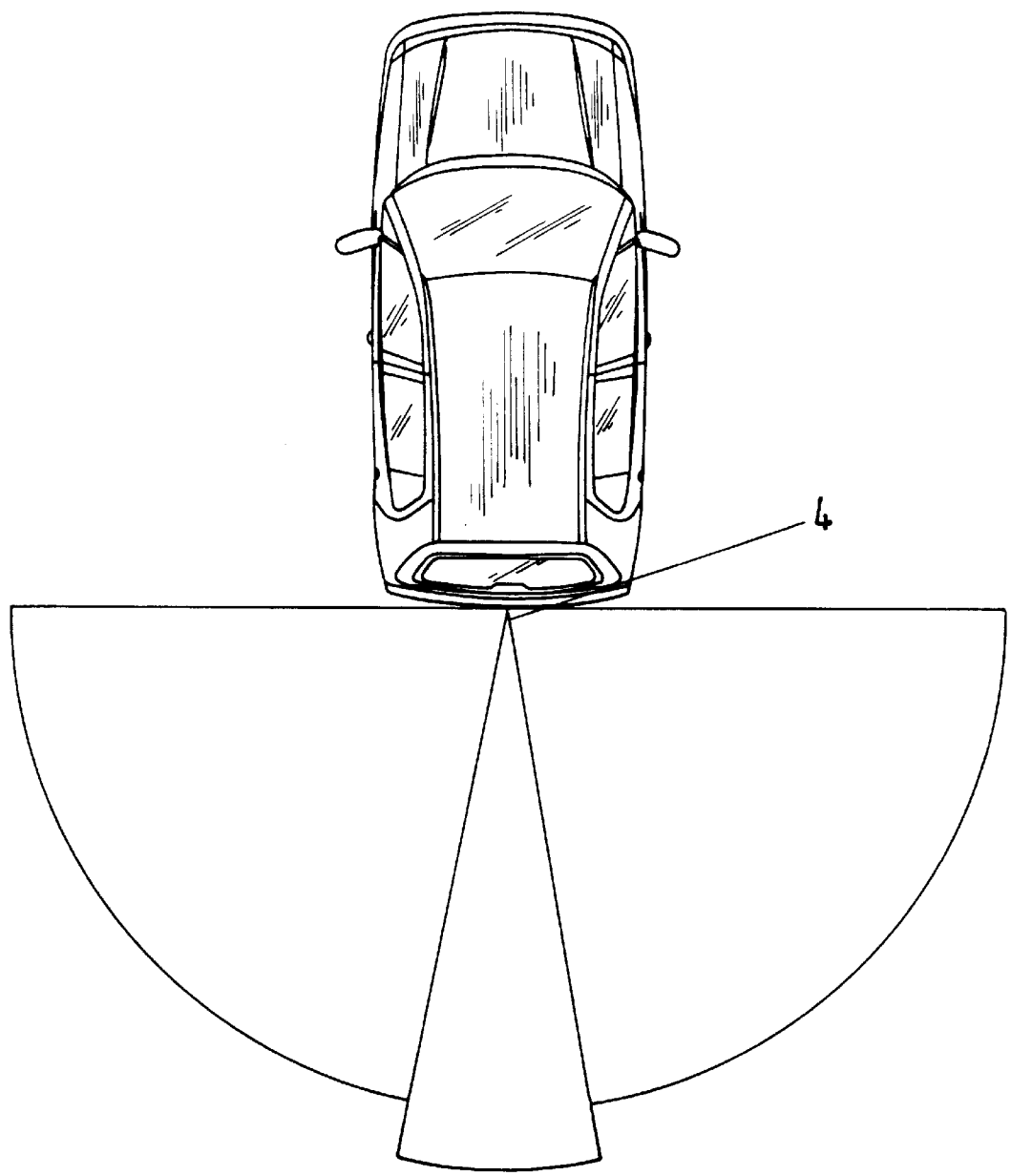
FIG. 5 illustrates the radiation pattern of a laser scanner sensor in the rear area of the vehicle.

Since only the aforementioned 180° angle in the rear area is required for the laser scanner sensor 4 for full all-around sensing, the remaining 180° of the potential scanning range of the laser scanner sensor 4 can be used for additional coverage within an inner 30° detection range as shown in FIG. 5, so that this laser scanner sensor provides quasi three-dimensional object detection in the middle area of that region. In case of failure of the laser scanner sensor 4, limited driving operation is still possible, but turning maneuvers may no longer be performed.

Figure 6:
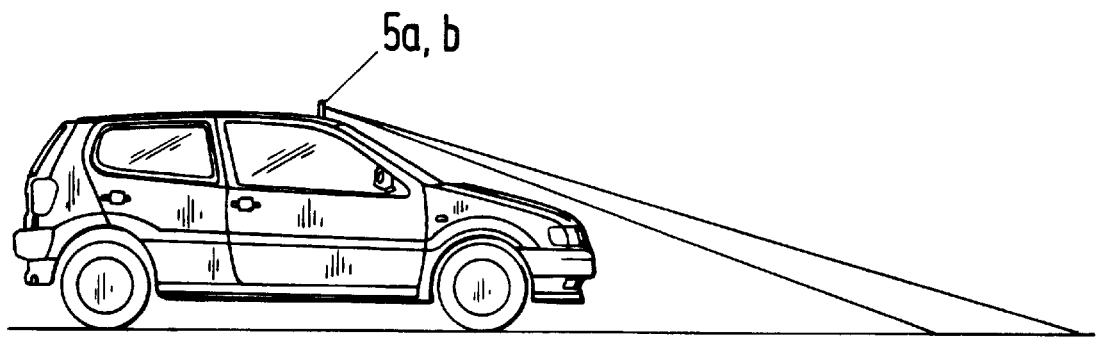
FIG. 6 is a side view showing the radiation pattern of a laser scanner sensor directed at the roadway in the front area of the vehicle.

Furthermore, it is advantageous to provide an additional downwardly directed laser scanner sensor 5a, shown in FIG. 6, on the front of the roof or on the windshield in the rear-view mirror region having the primary task of detecting holes in the ground or small obstacles on the ground. For this purpose, the angular orientation of the beam of the laser scanner sensor 5a in the vertical direction can be changed as a function of the vehicle speed and the weather to detect holes or obstacles before the vehicle reaches the hole or obstacle, if necessary. In contrast to the conventional arrangements, the orientation of this sensor is varied as a function of the weather conditions, since such conditions, in addition to the vehicle speed, have a critical effect on the length of the vehicle stopping distance. If an object traveling in front of the vehicle is located in the beam path of the laser scanner sensor 5a, that sensor takes over the task of sensing and tracking the object. The laser scanner sensor 5a has a horizontal detection angular range of 45° and vertical angular range of 5°. Because of the large horizontal detection range, this sensor can also assist in lane recognition and in recognition of the side edges of the lane or road.

As described hereinafter, a failure of the laser scanner sensor 5a would require immediate stopping of the autonomous vehicle. In order to avoid this problem, an identical laser scanner sensor 5b is preferably provided, either to immediately take over the tasks of laser scanner sensor 5a should it fail, or to operate concurrently with the laser scanner sensor 5a in order to provide a redundant overall system.

Because of the vertically limited field of view of the laser scanners 5a and 5b, an additional laser scanner sensor 6, which has the same horizontal and vertical detection range as the sensors 5a and 5b but is fixed in position, is provided at the top of the vehicle for the detection of clearance heights. In addition to clearance height detection, the laser scanner sensor 6 can also be used to assist in object recognition. A prerequisite for this, however, is screening of the laser scanner sensors 5a and 5b with respect to the laser scanner sensor 6. Failure of the laser scanner sensor 6 can be compensated by taking the clearance heights on the route directly from a digital map so that immediate shutdown of the autonomous vehicle in the event of such failure is not necessary.

At slow speeds of travel and when parking, it is not possible to completely detect objects along the flanks of the vehicle with the front corner laser scanner sensors 2 and 3. Consequently, for side detection, four ultra-sonic sensors 7a–7d and 8a–8d, for example, are mounted along opposite sides of the vehicle. These sensors can also be used to assist in road edge detection at slow speeds of travel.

Also mounted on the front part of the roof of the vehicle is a video camera 9 which serves primarily for lane recognition. Additionally, however, the video camera 9 can aid in road edge detection and object recognition. Furthermore, the camera 9 can also be used to assist the laser scanner sensor 6 in clearance height detection.

An additional video camera 10, located in the front area of the roof, is used for lane, object and/or traffic sign recognition. The cameras 9 and 10 can also be combined into a mutually complementary system with the camera 9 set up for far field recognition and the camera 10 set up for the near field recognition.

Figure 7:
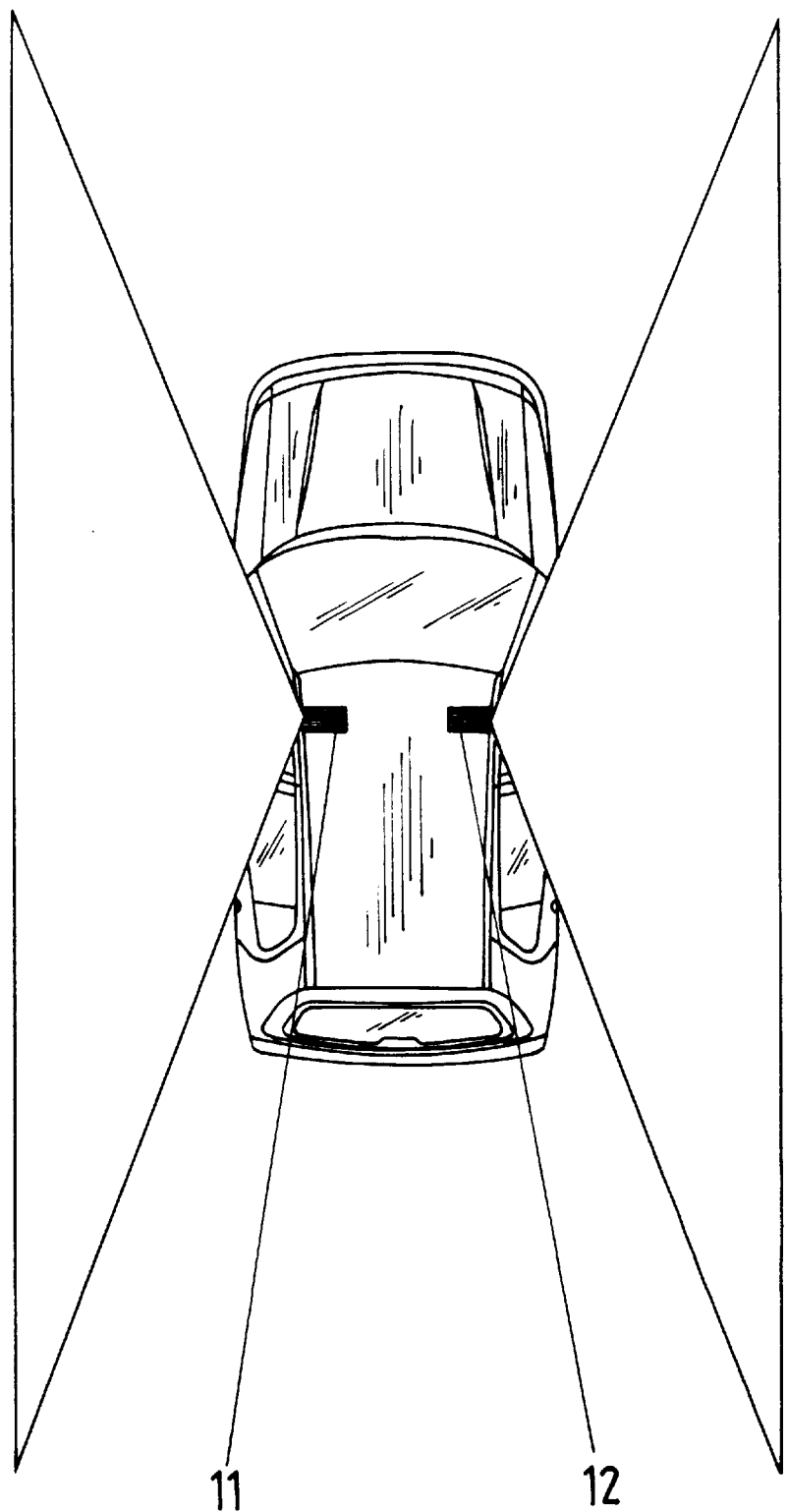
FIG. 7 is a top view showing the scanning pattern of two cameras located at the sides of the vehicle.

For detection of neighboring lanes and thus also detection of the vehicle's own lane and of the edge of the road, the autonomous vehicle has additional video cameras 11 and 12 arranged on each side of the roof with lateral sensing patterns shown in FIG. 7. By mounting another video camera 13 in the rear region of the autonomous vehicle, support for the lane and road edge recognition is also possible. The primary task of the video camera 13, however, is for support of the quasi three-dimensional laser scanner sensor 4 for object recognition.

For high-precision position finding, a DGPS (Differential Global Positioning System) is mounted on the roof of the vehicle. This sensor, in conjunction with a digital map, determines the absolute position of the autonomous vehicle in world coordinates. Such digital maps are conventional, for example, in navigation systems for modern motor vehicles. A failure of the DGPS sensor 14a would also lead to immediate stopping of the autonomous vehicle, as will be described later. In order to avoid this problem, an identical DGPS sensor 14b is preferably included in order to immediately take over the tasks of the DGPS sensor 14a should it fail. Moreover, both DGPS sensors 14a and 14b can be used in parallel to provide redundancy. In addition, a gyroscope or a gyroplatform can be used in order to be able always to determine exactly the position of the autonomous vehicle even in circumstances of radio frequency shielding, for example in a tunnel.

In addition, each of the individual wheels of the vehicle has a wheel sensor 15a–15d, by which the coefficient of road friction can be detected.

Also arranged on the roof of the autonomous vehicle are an air pressure sensor 16, a humidity sensor 17 and a temperature sensor 18. The data supplied by these sensors 16–18 are used to infer the current and expected weather conditions. These results are used for such purposes as verification of the results of the individual sensor systems, for example to determine the visibility conditions that can be expected and to coordinate with the visual ranges as determined by the laser scanner sensors 2–6.

Moreover, four directional microphones 19 combined with corresponding loudspeakers are also arranged on the autonomous vehicle. The microphones detect acoustic signals such as police and fire sirens, railroad crossings and the like. The loudspeakers permit the vehicle control center to be in verbal and communicative contact with any passers-by. For verbal announcements that do not require a response, the loud speakers can also be used directly by the autonomous vehicle.

Also arranged at the front of the roof is a thermal imaging camera 20 for the purpose of assisting the object detection system by providing a temperature profile and thus distinguishing motionless persons at the side of the road from inanimate objects, for instance. Furthermore the thermal imaging camera 20 is also suitable to a limited extent for performing lane and road edge detection. Advantageously, the individual cameras 9–13 and 20 are provided with a cooling system in order to compensate for heating as by direct solar radiation. Moreover, shielding measures can be taken in order to avoid dazzling of the cameras 9–13 and 20 by direct solar radiation or as a result of reflections from wet pavement.

Figure 2:
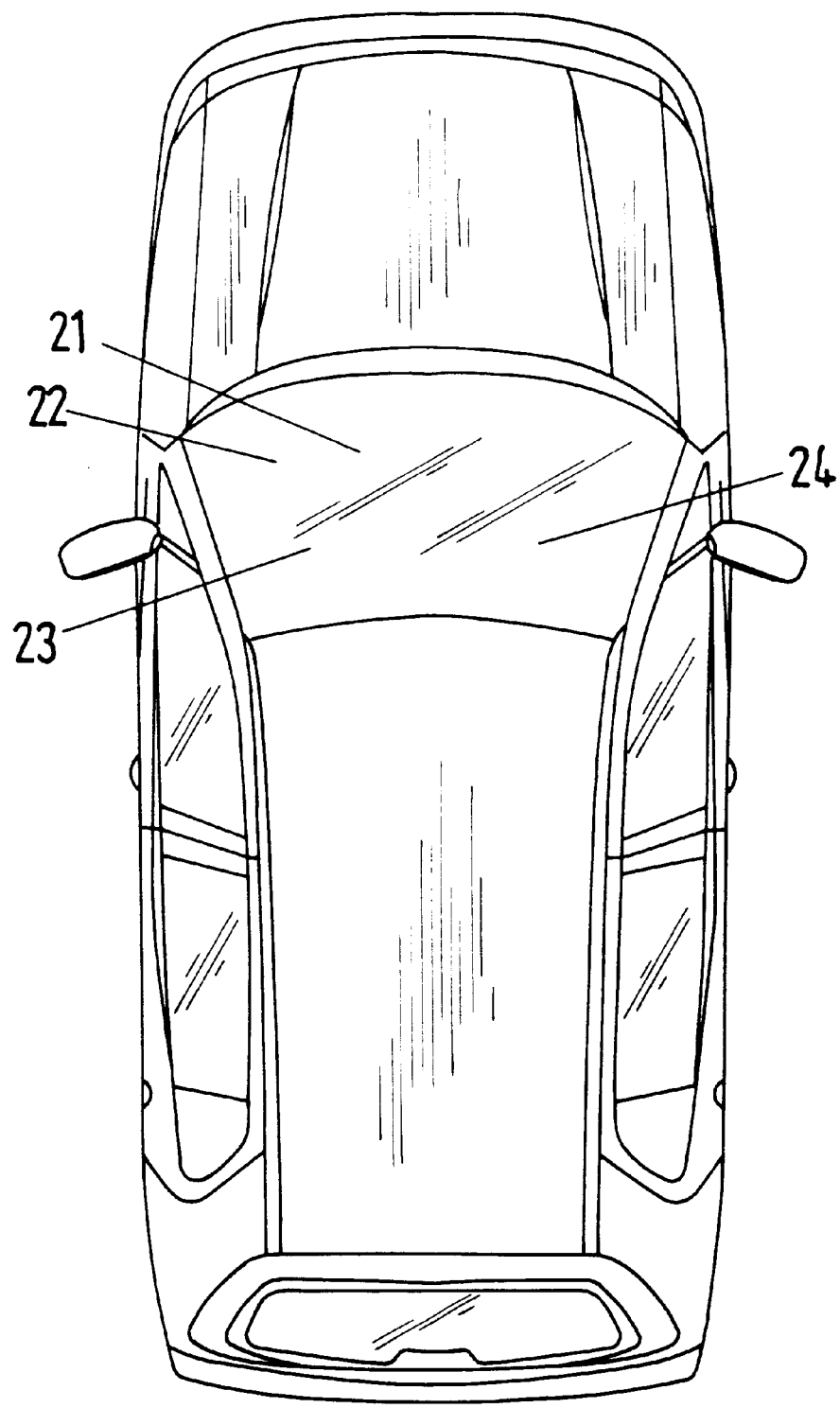
FIG. 2 is a top view of an autonomous vehicle showing a vehicle actuator system.

FIG. 2 is a top view of the autonomous vehicle with a schematic arrangement of possible actuators. The autonomous vehicle comprises at least one electrically controlled accelerator 21, one electrically controlled brake 22 and one electrically controlled steering system 23. If the vehicle is not equipped with an automatic transmission, an electrically controlled clutch 24 is additionally required. Such electrically controlled devices are known in basic principle from conventional motor vehicle technology as x-by-wire systems. In such systems, a mechanical control motion is converted into an electrical actuating signal so that the actuator, such as a pedal, is mechanically decoupled from the device to be controlled.

Since no human being is present to actuate the pedals or the steering wheel in the autonomous vehicle, the mechanical movement of the actuators must be replaced. In principle, two alternative arrangements are possible for this purpose. In one arrangement, the mechanical movement can be generated by a robot driver so that the conventional mechanical devices do not have to be modified. In another arrangement, the mechanical movement is eliminated entirely and the vehicle control device directly generates electrical control signals for the control units of the individual actuators. The operation of additional components, as, for example, the lighting system of the autonomous vehicle, is effected similarly.

Figure 8:
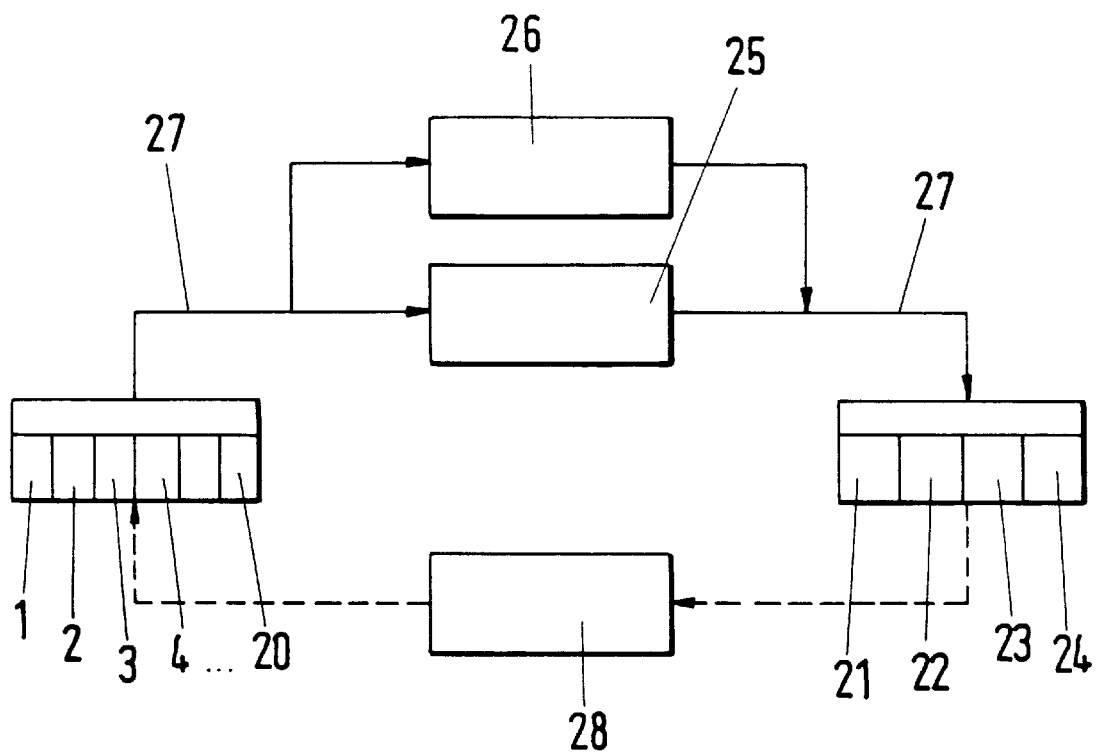
FIG. 8 is a schematic block diagram illustrating the top hierarchical level of the autonomous vehicle.

FIG. 8 is a schematic block diagram showing the top hierarchical level of the autonomous vehicle. The array of sensors 1–20 acquires information from the autonomous vehicle itself and its environment 28 and transmits such information to a vehicle computer 25 and to a collision avoidance device 26. The vehicle computer, by which the actual control of the autonomous vehicle takes place, and the collision avoidance device 26 work in parallel for safety reasons, so that the collision avoidance device 26 is effective to act upon the actuators 21–24 only to avoid a collision hazard. In normal operation, control of the actuators 21–24 is carried out exclusively by the vehicle computer 25. Data transmission from the sensors 1–20 to the vehicle computer 25 and to the collision avoidance device 26, and also to the actuators 21–24 takes place over CAN (Controlled Area Network) buses 27. In this process, the data are preferably distributed over several CAN buses 27 in order to assure reliable transmission of the volumes of data that are generated.

Since real-time processing of the data is necessary, the CAN buses 27 should not be operated at the upper limit of their transmission capacity. The preprocessed data from the individual sensors must therefore be transmitted separately from one another and reassembled in the downstream analysis units into an overall image on the basis of time sharing. In this context, a hierarchical principle with appropriate filter algorithms for information compression should be used as much as possible so as not to overload the analysis units.

Figure 9:
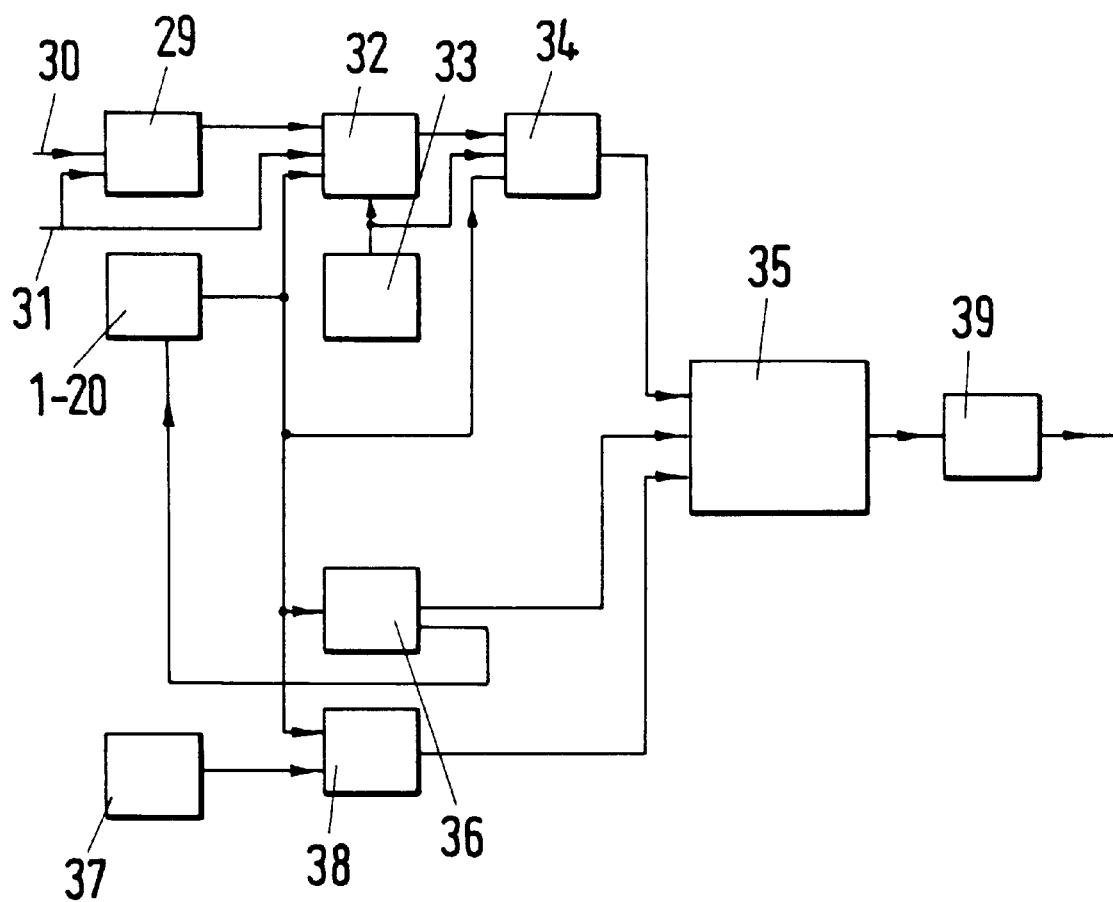
FIG. 9 is a block diagram illustrating the arrangement of a system for generating a virtual guide wire.

FIG. 9 shows a block diagram of an arrangement for generating a virtual guide wire. This arrangement comprises an input unit 29 to receive one or more travel orders that can be supplied over an internal connection 30 as well as from an external communication connection 31, for example, in the form of a mobile radio telephone. Depending on the application for the autonomous vehicle, the travel orders can contain further information in addition to the actual destination. For example, if the autonomous vehicle is to be used in public local passenger transport, the number of passengers to be carried is necessary as additional information in order to match this with the capacity of the vehicle. Moreover, the urgency of the travel order can also be taken into account. Such algorithms are already in use, for example for operations planning programs in local public transport, and are usable in principle.

In contrast, if the autonomous vehicle is used as an individual vehicle, the external communication connection 31 for the input 29 can be dispensed with, since only the user of the vehicle will issue the travel orders. The travel order or orders registered in the input unit 29 are then transmitted to a route planning unit 32. In addition, the route planning unit 32 receives the precise current position of the vehicle from the DGPS sensors 14a and 14b as well as traffic information from the external communication connection 31. The traffic information can include, for example, reports of traffic congestion, construction sites and information on large events such as concerts, demonstrations, soccer games or the like.

By using a digital map 33 which is associated with the route planning unit 32, the route planning unit determines an optimal route from the then current position to the desired destination, taking into account the traffic information from the external communication connection 31. The optimal route can be chosen in terms of either travel time or minimum fuel consumption. In addition to an actual street layout, the digital map 33 contains information such as clearance heights for bridges, the number of lanes in a road, traffic signs, and the like. Such digital maps 33 are already known for navigation assistance systems in motor vehicles. The optimal route is produced by the unit 32 in the form of a series of route segments, and each current route segment, and if necessary the subsequent route segment, is supplied to a vehicle path generation unit 34. The vehicle path generation unit determines an optimal vehicle path for the supplied route segment.

In addition to the vehicle path as such, the optimal path also includes information on the permissible maximum speeds for individual route segments, which lane should be selected, the radii of curves, traffic lights, right-of-way signs, stop signs, intersections, and where and how turns must be made. Such very precise information is necessary since the autonomous vehicle cannot act intuitively as a human being can. For example, even though he soon will have to turn left, a human driver drives as long as possible in the right or center lane so that he will not be obstructed by vehicles turning left at preceding intersections, and then switches to the left turning lane depending on the traffic situation. The other information is necessary so that the autonomous vehicle can adapt its driving behavior in a timely fashion. This is important particularly with regard to other traffic participants, for whom very abrupt driving behavior is irritating and could lead to incorrect judgments. Since not all information regarding the infrastructure is contained as advance information in the digital map 33, for instance because new traffic signs have been installed, the vehicle path control unit 34 is additionally supplied with the acquired sensor signals from the sensors 1–20, from which additional infrastructure information can be taken, for example the traffic signs detected by the video camera 10 or the weather conditions detected by the sensors 16–18, upon which the maximum permissible speed can depend, for example. The optimal vehicle path, which one could also refer to as a virtual ideal control wire, is determined from all this information. The generated ideal path is transmitted together with the current visual sensor information from the sensors 9–13 and 20.

The acquired sensor signals from the sensors 1–20 are also supplied to an object recognition unit 36. The object recognition unit 36 analyzes the information according to whether one or more objects were detected, what type of objects are involved (for example, moving or stationary), and, if necessary, generates control signals for the tracking motion of individual sensors, such as the camera 9, for example. In order to be able to draw exact conclusions concerning the nature and type of object or obstacle based on the sensor data, the prevailing weather conditions must be known. These can be determined primarily from the information from the sensors 16–18. Since the unit 34 for generation of a vehicle path also requires the weather conditions, these can also be centrally determined and supplied to the appropriate components.

In addition, the object recognition unit 36 analyzes the sensor information according to how much traffic-free area exists around the vehicle even beyond the current vehicle position. This information is particularly important for the execution of any necessary avoidance maneuvers. The principle mode of procedure in the analysis of sensor information in this context is known to the expert, for example from ADR (Automatic Distance Regulation) systems. An additional factor here is that the various sensor information from the different sensors such as the radar sensor 1 and the laser scanner sensors 2 and 3 must be weighted or reconciled with one another as a function of weather conditions. The object recognition unit 36 supplies to a vehicle control unit 35 the calculated traffic-free area, the detected, tracked and classified objects with their condition vectors, i.e. location, relative velocity, etc., as well as the prevailing weather conditions.

In addition to the sensors 1–20 listed above, the autonomous vehicle also has further sensors 37 providing information to a unit 38 for vehicle condition data recognition which assembles and generates general data relating to the condition of the vehicles and the condition vector for the vehicle itself. The sensors involved here are adequately known in terms of type and arrangement from modem motor vehicles so that a more detailed explanation is not necessary. Taken into account here in particular are vehicle conditions such as the engine speed, vehicle speed, ABS sensor information, coefficients of friction, steering angle, and the like, and information from the sensors 1–20, for example the wheel sensors 15, is also included. In addition, the sensors 37 can generate a status report for any subsystem. The status reports and the vehicle condition vector are likewise supplied to the vehicle control unit 35.

The vehicle control unit 35 then generates from all the supplied information a real control vector which is transmitted to a vehicle actuator control unit 39 for the vehicle actuators 21–24 as well as passive vehicle components such as the turn signals, the vehicle lighting system, the windshield wiper system, and the like. In contrast to the optimal vehicle path determined by the unit 34, this control vector also takes into account dynamic changes such as the presence of detected and moving objects or the color of the traffic signal. For each section, the control vector thus contains a set of control commands for the actuators 21–24 and vehicle components to be operated, where the rate of change of the control vector is dependent on the infrastructure and the surrounding traffic. The traffic regulations to be observed, for example, right before left at an intersection with equal right of way, are stored in the vehicle control unit 35 in the form of algorithms. Since the number of traffic signs accompanied by frequent changes in right-of-way situations is very large, especially in city driving, either as many traffic signs as possible must be integrated in the digital map 33 or, preferably, a parallel processing system is provided since otherwise the vehicle speed must be adapted to the processing speed of the vehicle control unit 35, which under certain circumstances could be perceived as irritating by human drivers. In order to increase the acceptance of autonomous vehicles among passengers as well as among other traffic participants, the vehicle control unit 35 can additionally be provided with a human driving strategy, for example a slow approach to a red light.

Although the invention has been described herein with reference to specific embodiments, many modifications and variations therein will readily occur to those skilled in the art. Accordingly, all such variations and modifications are included within the intended scope of the invention.

We claim:

1. An autonomous vehicle arrangement, comprising:
   an input unit for travel orders;
   a vehicle route planning unit comprising at least one position finding unit and a digital street map;
   a vehicle path generating unit for generating a vehicle path from a present location to a designated destination;
   a plurality of sensors including at least one range sensor for detecting objects and condition features of the vehicle path;
   a collision avoidance unit;
   a vehicle condition data recognition unit;
   a vehicle control unit; and
   a vehicle actuator control unit for controlling vehicle drive system actuators based on signals generated by the vehicle control unit;
   wherein the plurality of sensors includes:
   at least one range sensor located in a front area of the vehicle;
   at least one range sensor located in a rear area of the vehicle;
   a plurality of ultrasonic and/or microwave radar sensors located at the sides of the vehicle; and
   at least one camera located in each of the front and rear areas of the vehicle.

2. An autonomous vehicle arrangement in accordance with claim 1 wherein the plurality of sensors includes two laser scanner sensors directed essentially horizontally and arranged in a front area of the vehicle.

3. An autonomous vehicle arrangement in accordance with claim 2 wherein the laser scanner sensors have a horizontal detection range angle of about 270°.

4. An autonomous vehicle arrangement in accordance with claim 1 wherein a range sensor located in the rear area of the vehicle is a laser scanner sensor.

5. An autonomous vehicle arrangement in accordance with claim 4 wherein the laser scanner sensor in the rear area is effective at least partially as a three-dimensional laser scanner.

6. An autonomous vehicle arrangement in accordance with claim 1 wherein a range sensor located in the front area of the vehicle is a radar sensor.

7. An autonomous vehicle arrangement in accordance with claim 1 including a further range sensor which is adjustable in sensing range as a function of vehicle speed and/or weather conditions.

8. An autonomous vehicle arrangement in accordance with claim 7 wherein the further range sensor is a laser scanner sensor directed toward the roadway in front of the vehicle.

9. An autonomous vehicle arrangement in accordance with claim 8 wherein the laser scanner sensor directed toward the roadway is mounted near the forward end of the roof of the vehicle.

10. An autonomous vehicle arrangement in accordance with claim 8 wherein the laser scanner sensor is mounted behind the windshield of the vehicle in a rear-view mirror area.

11. An autonomous vehicle arrangement in accordance with claim 1 wherein the cameras located in the front and rear areas of the vehicle are arranged for recognition of objects and/or traffic signs and/or lanes.

12. An autonomous vehicle arrangement in accordance with claim 8 wherein the further range sensor has a horizontal detection range and a vertical detection range and the horizontal detection range is greater than the vertical detection range.

13. An autonomous vehicle arrangement in accordance with claim 8 wherein the further range sensor is designed with redundancy.

14. An autonomous vehicle arrangement in accordance with claim 1 including an additional range sensor having a fixed setting and scan angle located on the roof of the vehicle for sensing allowable clearance heights.

15. An autonomous vehicle arrangement in accordance with claim 14 wherein the additional range sensor is a laser scanner sensor.

16. An autonomous vehicle arrangement in accordance with claim 1 including a first camera for near field recognition and a second camera for far field recognition mounted in the front area of the vehicle.

17. An autonomous vehicle arrangement in accordance with claim 1 including a front-facing camera arranged on each side of the vehicle.

18. An autonomous vehicle arrangement in accordance with claim 1 wherein the cameras are CCD cameras.

19. An autonomous vehicle arrangement in accordance with claim 1 including at least one wheel sensor for each of the wheels of the vehicle for detection of the coefficient of road friction.

20. An autonomous vehicle arrangement in accordance with claim 1 wherein the plurality of sensors includes at least one of a temperature sensor, a humidity sensor and an air pressure sensor.

21. An autonomous vehicle arrangement in accordance with claim 1 including at least one microphone and/or at least one loudspeaker.

22. An autonomous vehicle arrangement in accordance with claim 1 including a thermal imaging camera mounted in the front area of the vehicle for the detection of living creatures.

23. An autonomous vehicle arrangement in accordance with claim 1 wherein the position finding device includes a DGPS sensor.

24. An autonomous vehicle arrangement in accordance with claim 23 wherein the DGPS sensor is designed with redundancy.

25. An autonomous vehicle arrangement in accordance with claim 1 wherein the vehicle actuator control unit includes at least one of an x-by-wire system and a driving robot.

26. An autonomous vehicle arrangement in accordance with claim 1 including an external communication system connected to at least one of the route planning unit and the input unit for travel orders.

27. An autonomous vehicle arrangement in accordance with claim 1 wherein the position finding unit includes a gyroscope or a gyroplatform.

28. An autonomous vehicle arrangement in accordance with claim 1 including a vehicle computer and at least one data bus connecting the vehicle computer to the plurality of sensors or to the vehicle drive system actuators.

29. An autonomous vehicle in accordance with claim 1 wherein the data bus is a CAN bus.

30. A method for controlling an external communication system of an autonomous vehicle having an input unit for travel orders, a route planning unit containing a position finding device and a digital street map, a vehicle course generating unit for generating a vehicle course from a present location to a desired destination, an external communication system, an object recognition device, a vehicle control unit, a vehicle drive system actuation and a plurality of sensors, comprising the following steps:

a) providing an input to the input unit representing a desired travel destination;

b) transmitting the input travel destination to the route planning unit;

c) detecting the current vehicle location by the position finding device;

d) determining a route, defined in route segments, from the current vehicle location to the travel destination by a digital map and optimization algorithms, taking into account any traffic information provided over the external communication system;

e) transmitting to the vehicle course generating unit from the route planning unit the individual route segments to be traveled and the current location of the vehicle;

f) generating an optimized course for the transmitted route segments, taking into account any traffic information provided over the external communication system and infrastructure information stored in the digital map and/or detected by the plurality of sensors;

g) transmitting the generated course, the vehicle condition data and the data acquired by the plurality of sensors to the vehicle control unit;

h) verifying in the vehicle control unit the functionality of individual vehicle modules and sensors and any intervention in the vehicle actuator system in order to bring the vehicle into a safe condition in the event of system defects relevant to safety;

i) generating a control vector for individual vehicle drive system actuators for implementing the generated course, taking into account data acquired by the object recognition device; and j) transmitting the control vector to the control unit for controlling the vehicle actuator drive system to cause the associated control data to be transmitted from the control vector to the individual vehicle actuators.

31. A method in accordance with claim 30 including determining the traffic signal signs to be observed for each current route segment by use of the digital map and the video camera, and causing the control vector to be brought into agreement with the traffic regulations by using traffic regulation algorithms stored in the vehicle control device.

* * * * *